Jan. 12, 1954   C. R. VEGREN   2,665,931
QUICK ACTING CONNECTOR
Filed Jan. 23, 1952
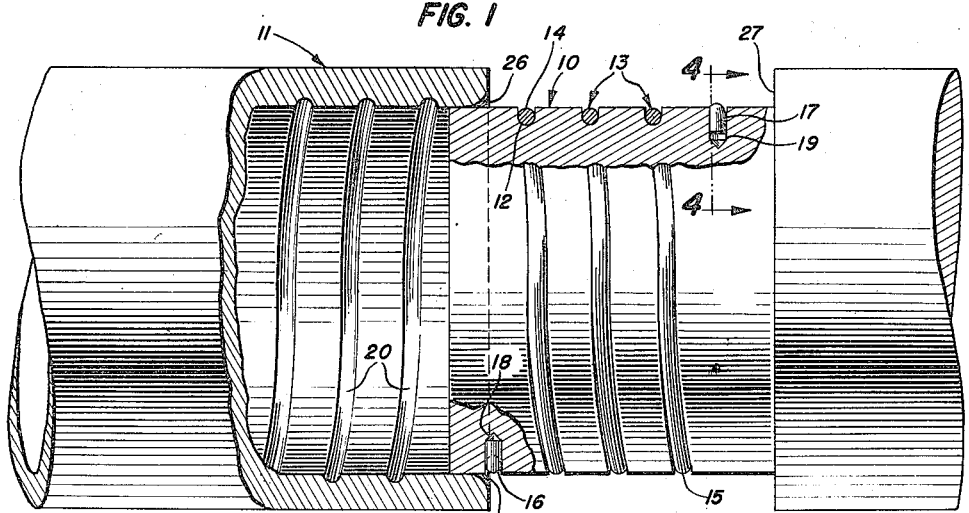
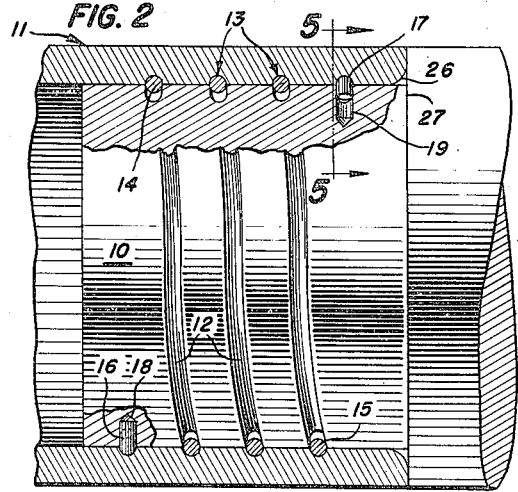
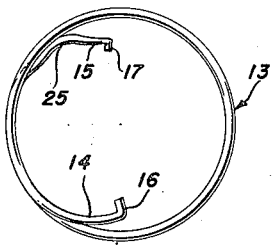
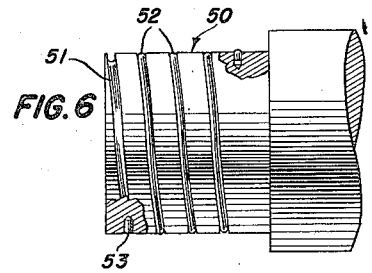
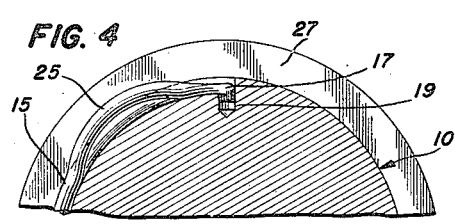
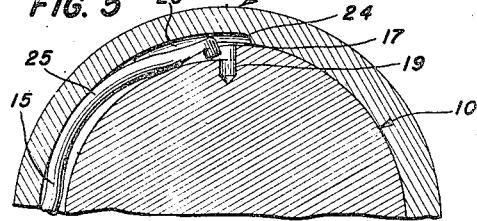
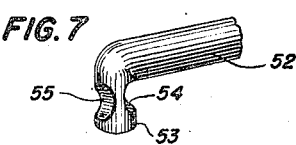
INVENTOR
CONRAD R. VEGREN
BY
ATTORNEY Patented Jan. 12, 1954

2,665,931

UNITED STATES PATENT OFFICE 2,665,931

QUICK ACTING CONNECTOR

Conrad R. Vegren, Washington, D. C.

Application January 23, 1952, Serial No. 267,900

5 Claims. (Cl. 287—119)

(Granted under Title 35, U. S. Code (1952), sec. 266)

The present invention relates to a connector and more particularly to a high strength quick acting means for connecting mating parts which are to be joined concentrically with one another.

When mating parts of the above type are to be connected, it is frequently necessary that the parts be quickly attachable and that the connection be positive and safe to the extent that the mating members will not easily part during normal use. Means which have heretofore been used to connect such members have involved, among other things, the use of matching internal and external threads, detents, keys, and pins. Where large numbers of parts must be quickly assembled, as when rocket heads are to be attached to rocket motors just prior to launching, threaded connections are often unsuitable because of the time and labor required to secure the members together. The other methods of attachment enumerated above involve either a considerable waste of time to assemble or do not provide a sufficiently positive connection between members.

The present invention overcomes the disadvantages associated with prior art connecting means by providing a tensioned coil spring which prior to joining of the parts lies radially depressed in a spiral groove on a male member, the depth of the groove being substantially equal to or greater than the cross sectional diameter of the spring wire. A female member is provided with a complementary internal spiral groove of less depth than the cross sectional diameter of the spring wire and the arrangement may be such that when the members are joined and the spiral grooves brought into registry with each other the coil spring expands into the internal grooves of the female member and the members are tightened together by rotating either one or the other in a manner common to any screw coupled joint.

With the foregoing in mind, it is an object of the present invention to provide an interlocking connector for male and female members.

Another object of the invention is to provide a connection of the above type which is automatically self-locking.

Another object of the invention is to provide a lock connection for male and female members which is both positive in operation and rapid in use.

Another object of the invention is to provide a high strength quick acting connector which is easily actuated.

Still another object is the provision of a permanent lock between members being joined.

These and other objects and their attendant advantages will become apparent from the following detailed description when read in conjunction with the accompanying drawings in which:

Fig. 1 is a longitudinal view partly in section of one embodiment of the present invention;

Fig. 2 is a change position view similar to Fig. 1 showing the male and female members assembled and locked in position;

Fig. 3 is a reduced transverse elevation view of a form of coil spring that may be employed in the present invention;

Fig. 4 is a fragmentary cross section view taken along a line substantially corresponding to line 4—4 of Fig. 1 and showing a portion of the coil spring connector locked in position on the male member as it appears before connection with a mating member;

Fig. 5 is a change position view similar to Fig. 4 taken along a line substantially corresponding to line 5—5 of Fig. 2 and showing a portion of the coil spring connector as it appears after the connection of the mating members;

Fig. 6 is a longitudinal view partly in section of a second embodiment of the present invention in which the grooves on the male member have been extended to the end thereof; and Fig. 7 is an enlarged perspective view of one of the coiled connector spring tangs which may be used in conjunction with the embodiment shown in Fig. 6 and which has been notched to facilitate its removal.

Referring now to the drawing wherein like reference numerals designate like parts throughout the several views and more particularly to Fig. 1 wherein there is disclosed a coupling assembly which includes an externally grooved male connecting member 10 which is to be made contiguous with and connected to an internally grooved female connecting member 11. The male member 10 has an external helical or spiral groove 12 machined therein which extends less than the length of the member for accommodating a coiled connector spring 13 having a form illustrated in Fig. 3. The material of spring 13, although disclosed as circular in cross section, may be constructed of a material having a square cross section. The groove 12 is of a predetermined depth which is equal to or greater than the diameter of the material of which the spring 13 is constructed and having a sectional configuration complementary to that of the spring material, so that when the spring is mounted in the groove 12 about the member 10 the upper surface thereof lies flush with or below the outer surface of the member 10, thus presenting an effectively smooth surface relatively free from any obstruction that might impede the joining of the connecting members 10 and 11. The spring 13, which in a normal expanded condition (Fig. 3) is of a larger external diameter than the major diameters of the male member 10 and the female member 11, has ends 14 and 15 which are of a smaller arc radius than the intermediate convolutions of the spring and smaller than the arc radius of the male member. These ends 14 and 15 terminate in inwardly projecting spring retaining tangs 16 and 17, respectively, which serve as locking means to maintain the loops of spring 13 within the confines of groove 12 by engaging suitable recesses 18 and 19 located at opposite ends of the groove. The tangs 16 and 17 are maintained within their respective recesses 18 and 19 by an inwardly directed radial force exerted by the end convolutions 14 and 15 which are in a distorted condition with an increased arc radius equal to that of the groove 12 in order that they might lie flush with or below the surface of the male connecting member 10. The distance between the recesses 18 and 19 along the longitudinal axes of the male connecting member 10 is greater than the distance between the tangs 16 and 17 along the longitudinal axes of the coiled connector spring 13, therefore, in order to position the tangs 16 and 17 in their respective recesses 18 and 19, it is necessary to expand the spring 13 along its longitudinal axes which places the spring under longitudinal tension and radial compression.

The female member 11 has an internal spiral groove 20 therein which has the same pitch as that of the groove 12 on the male member 10 and is of a depth that is less than the diameter of the spring wire so that upon the joining of the members 10 and 11 and the radial expansion of coiled connector spring 13, the members are locked together by the spring which is in contact with the grooves 12 and 20 (Fig. 2).

The loaded spring 13 is released to expand radially by the withdrawal of tang 17 from its recess 19. The tang 17 is withdrawn by pressure being exerted upon a deformed portion 25 of the last convolution 15 which protrudes above the outer surface of male member 10 when the spring 13 is loaded on the member (Fig. 4). In the embodiment shown, pressure is applied to the deformed portion 25 by a beveled leading edge 26 of the female member 11 when these members 10 and 11 are joined. The leading edge 26 contacts the deformed portion 25 and forces it into the groove 12 of the male member 10, whereupon the tang 17 is raised from the recess 19 thus conditioning the spring to expand radially. The members 10 and 11 are then urged closer together until the leading edge 26 of the female member contacts a shoulder 27 on the male member and the members twisted until the grooves 12 and 20 register, the spring 13 then expands into the groove 20 to lock the members together (Figs. 2 and 5).

Because of the unique construction of the elements it is impossible to separate the members 10 and 11 once they have been assembled. Any attempt to separate the members 10 and 11 must necessarily be by turning the member 10 counterclockwise with relation to the female member 11. This rotating motion causes tang 17 of the spring 13 to abut an end 24 of the groove 20, and since tang 16 remains within the recess 18, any further movement of the members will result in the lineal compression and further radial expansion of the spring which increases the friction between the groove 20 and the spring to prevent further relative movement between the members 10 and 11, and hence prevent separation of the members.

In view of the above disclosure, a second embodiment becomes readily apparent to those skilled in the art. In this variation, the grooves in the male and female members may be shallow and deep respectively instead of deep and shallow as shown. The spring is then reversed so that the tangs are directed outwardly and the deformed portion extends inwardly. This inversion is readily visualized without illustration, for the elements, except for the basic male and female members are reversed. The spring is held in radial tension within the female member to be radially compressed, upon contact of the members and thereby engage the grooves of the male member to lock the members together.

In some instances the provision of a permanent lock between members may be undesirable; therefore in Fig. 6 there is disclosed another embodiment of the invention wherein a male connecting member 50 is provided having features which permit its ready disconnection from a mating member. The male member 50 has a spiral groove 51 formed therein which extends the entire length of the member. In this embodiment the groove 51 is of sufficient depth to accommodate a helical or spiral coiled connector spring 52, similar in configuration to that disclosed in Fig. 3 and in a manner described in conjunction with the previous embodiment of this invention. The spring 52 has a first convolution which terminates in a tang 53 which is weakened by notches 54 or 55, or both at the point where it joins the spring (Fig. 7), so that when the member 50 is assembled with its mating member (not shown) as described above, a twist of predetermined force will snap the tang 53 and permit the member to be disassembled in a manner similar to the unscrewing of conventional threads. The spring 52 which remains within the female member may be removed by the use of a compression tool or any other suitable means.

A further embodiment may be provided in order to permit the members to be readily separated, that being to extend the grooves in the female member 11, in the same manner as shown on the male member 50 in Fig. 6, and thus permit the members to be unscrewed in the conventional manner without the necessity of rupturing one of the tangs.

Referring again to the first embodiment and assuming the male and female members of the type which are stored separately to be assembled just prior to use, as is the case with rocket heads and motors, the members are provided, at the time of manufacture, with the hereinbefore described grooves and the spring 13 is assembled within the male groove 12 by expanding the end convolutions 14 and 15 sufficiently to permit the spring to slide over the exterior surface of the male member 10 until the tang 16 registers with its recess 18. Releasing the convolution 14 permits the tang 16 to engage the recess 18 by the convolution's natural resiliency. The spring 13 may then be worked into and along the groove 12 until the tang 17 registers with its recess 19; said tang naturally seating therein because of the reduced diameter of the last convolution 15. Thus, the spring 13 will be retained locked in a tensioned condition in the groove 12 and the male and female members may be quickly assembled at some future time by the simple process of sliding them together until the deformed portion 25 of the spring 13 is depressed by the beveled leading edge 26 of the female member to disengage the tang 17 and permit the spring 13 to expand radially into the groove 20 of the female member when the groove 12 has been properly registered therewith.

While the devices disclosed herein are preferred embodiments of the invention, it is to be understood that the invention may be embodied in other forms without departing from the spirit or scope of the invention as defined by the appended claims.

The invention described herein may be manufactured and used by or for the Government of the United States of America for governmental purposes without the payment of any royalties thereon or therefor.

What is claimed is:

1. In a connector assembly, a male member having an external groove, a female member having an internal groove, a resilient spring mounted in the groove of one of the members, the groove receiving the spring being of a depth substantially equal to the thickness of spring material and the groove in the opposite member being of a depth materially less than the thickness of the spring material, interengaging means on the spring and said one member for retaining the spring in a tensioned condition in the groove of said one member, and means to release said interengaging means upon assembly of the members whereby to permit the spring to expand into the grooove in the opposite member to lock said members together.

2. In a connection of male and female members, a male member having an external groove, a female member having an internal groove, a resilient spring mounted in the groove of one of the members, tangs on the opposite ends of the spring, the groove which receives the spring being of a depth substantially equal to the thickness of the spring material and having tang receiving recesses therein to retain the spring mounted in said groove and the groove in the opposite member being of a depth materially less than the thickness of the spring material, and a deformed portion in said spring adjacent one end thereof for contact with the opposite member to disengage a tang from its recess whereby the spring may be released to expand into the shallow groove upon assembly of the members.

3. In a connection of male and female members, a male member having an external groove, a female member having an internal groove, a resilient spring mounted in the groove of one of the members and having tangs at opposite ends thereof, the groove which receives the spring being of a depth substantially equal to the thickness of the spring material and having tang receiving recesses therein to retain the spring within the groove and the groove in the opposite member being of a depth materially less than the thickness of the spring material, and means to release the spring to expand into the shallow groove upon assembly of the members to lock said members together.

4. In a connector assembly, a male member having an external spiral groove, a female member having an internal spiral groove, a resilient spring in the groove of the male member, the diameter of said spring in a normal unstressed condition being greater than the diameter of the spiral groove in the female member, interengaging means on the spring and male member to maintain the spring in a tensioned condition in the groove, the groove in the male member being of a depth substantially equal to the thickness of the spring material and the groove in the female member being of a depth materially less than the depth of the groove containing the spring, and means to release the interengaging means upon assembly of the members whereby to permit said spring to expand into the shallow groove of the female member to lock said members together.

5. In a connecetor assembly, a male connecting member having a groove therein, a female connecting member having a groove which terminates short of the leading edge thereof, a resilient tension spring mounted in the groove of the male member and terminated at each end in a tang, said male groove being of a depth substantially equal to the thickness of the spring material and having tang receiving recesses therein to retain the spring therein and the female groove being of a depth materially less than the thickness of the spring material, means for disengaging one of the tangs from its recess to release the resilient means to expand into the shallow groove upon assembly of the members, the engaged tang being notched so as to cause it to break off upon twisting of the members to permit the members to be disassembled.

CONRAD R. VEGREN.

References Cited in the file of this patent

UNITED STATES PATENTS

| Number | Name | Date |
| --- | --- | --- |
| 738,503 | Waters | Sept. 8, 1903 |
| 1,464,386 | Ingram | Aug. 7, 1923 |
| 1,820,644 | Bach | Aug. 25, 1931 |
| 1,891,460 | Vlahek | Dec. 20, 1932 |
| 2,346,051 | Seamark | Apr. 4, 1944 |
| 2,418,418 | Martin | Apr. 1, 1947 |

FOREIGN PATENTS

| Number | Country | Date |
| --- | --- | --- |
| 19,932 | Great Britain | of 1897 |